US012148263B2

(12) United States Patent
Shigeta

(10) Patent No.: US 12,148,263 B2
(45) Date of Patent: Nov. 19, 2024

(54) TABLE GAME MANAGEMENT SYSTEM, GAMING TABLE LAYOUT, AND GAMING TABLE

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 41 days.

(21) Appl. No.: 17/827,014

(22) Filed: May 27, 2022

(65) Prior Publication Data

US 2022/0292910 A1 Sep. 15, 2022

Related U.S. Application Data

(63) Continuation of application No. 16/965,096, filed as application No. PCT/JP2019/001025 on Jan. 16, 2019, now Pat. No. 11,393,281.

(30) Foreign Application Priority Data

Jan. 30, 2018 (JP) ................................ 2018-027395

(51) Int. Cl.
*G07F 17/32* (2006.01)
*A63F 1/00* (2006.01)
*A63F 1/06* (2006.01)

(52) U.S. Cl.
CPC ............ *G07F 17/322* (2013.01); *A63F 1/067* (2013.01); *G07F 17/3241* (2013.01);
(Continued)

(58) Field of Classification Search
None
See application file for complete search history.

(56) References Cited

U.S. PATENT DOCUMENTS 4,814,589 A 3/1989 Storch et al.
5,613,912 A 3/1997 Slater
(Continued)

FOREIGN PATENT DOCUMENTS

AU 2016356234 A1 5/2017
AU 2016356234 B2 5/2017
(Continued)

OTHER PUBLICATIONS

Gaming Concepts, "Special—Bean Baccarat Tables", http:i/gamingconceptsgroup.com/2013/baccarat-table-sale/, retrieved on Sep. 16, 2020.
(Continued)

*Primary Examiner* — Ronald Laneau
(74) *Attorney, Agent, or Firm* — NORTON ROSE FULBRIGHT US LLP

(57) ABSTRACT

An excellent gaming table layout which includes a bet area for a player, a bet area for a banker, a bet area for a tie, a bet area for a player pair, and a bet area for a banker pair which are arranged in a plurality of rows for each player position in a gaming table layout and is capable of evaluating whether or not a gaming table layout is excellent by photographing a game token with a camera device or the like, recognizing a type of the game token and the number of game tokens, and further calculating a ratio of an amount of money bet on a side bet is provided.

33 Claims, 8 Drawing Sheets

(52) U.S. Cl.
CPC ...... *G07F 17/3248* (2013.01); *G07F 17/3262* (2013.01); *G07F 17/3293* (2013.01); *A63F 2001/001* (2013.01)

(56) References Cited

U.S. PATENT DOCUMENTS

| | | | | |
|---|---|---|---|---|
| 5,831,527 | A | 11/1998 | Jones, II et al. | |
| 5,876,283 | A | 3/1999 | Parra et al. | |
| 6,283,856 | B1 | 9/2001 | Mothwurf | |
| 9,262,885 | B2 | 2/2016 | Moore et al. | |
| 11,288,923 | B1 * | 3/2022 | Shigeta | G07F 17/3248 |
| 2004/0015423 | A1 | 1/2004 | Walker et al. | |
| 2004/0219975 | A1 | 11/2004 | Soltys et al. | |
| 2005/0051965 | A1 | 3/2005 | Gururajan | |
| 2006/0019739 | A1 | 1/2006 | Soltys et al. | |
| 2006/0177106 | A1 | 8/2006 | Wrage | |
| 2006/0177109 | A1 | 8/2006 | Storch | |
| 2006/0252521 | A1 | 11/2006 | Gururajan et al. | |
| 2007/0116604 | A1 | 5/2007 | Brenneman et al. | |
| 2007/0117604 | A1 | 5/2007 | Hill | |
| 2011/0065490 | A1 | 3/2011 | Lutnick | |
| 2011/0275432 | A1 | 11/2011 | Lutnick et al. | |
| 2011/0300917 | A1 | 12/2011 | Hill | |
| 2012/0080845 | A1 | 4/2012 | Emori et al. | |
| 2012/0119441 | A1 | 5/2012 | Daines | |
| 2013/0324232 | A1 | 12/2013 | Snow | |
| 2014/0378199 | A1 | 12/2014 | Mulligan | |
| 2015/0021856 | A1 | 1/2015 | Lessinger | |
| 2016/0121201 | A1 | 5/2016 | Moore et al. | |
| 2016/0125686 | A1 | 5/2016 | Grubmueller, Jr. | |
| 2016/0335837 | A1 | 11/2016 | Shigeta | |
| 2017/0018140 | A1 * | 1/2017 | Yamaguchi | A63F 1/067 |
| 2017/0039807 | A1 | 2/2017 | Shigeta | |
| 2017/0193735 | A1 | 7/2017 | Mandava et al. | |
| 2017/0203198 | A1 | 7/2017 | Lysowski et al. | |
| 2017/0337779 | A1 | 11/2017 | Takasaki et al. | |
| 2018/0070687 | A1 | 3/2018 | Shigeta | |
| 2018/0114406 | A1 | 4/2018 | Shigeta | |
| 2019/0005767 | A1 | 1/2019 | Shigeta | |
| 2019/0130700 | A1 | 5/2019 | Oguchi et al. | |
| 2019/0188958 | A1 | 6/2019 | Shigeta | |
| 2019/0236891 | A1 | 8/2019 | Shigeta | |
| 2020/0294359 | A1 * | 9/2020 | Bulzacki | G07F 17/3223 |
| 2020/0402344 | A1 | 12/2020 | Shigeta | |
| 2024/0046749 | A1 | 2/2024 | Shigeta | |

FOREIGN PATENT DOCUMENTS

| | | | |
|---|---|---|---|
| CA | 2984408 | A1 | 2/2017 |
| CN | 001954346 | A | 4/2007 |
| CN | 102892472 | A | 1/2013 |
| CN | 105848740 | A | 8/2016 |
| CN | 106062836 | A | 10/2016 |
| CN | 106408785 | A | 2/2017 |
| CN | 107358758 | A | 11/2017 |
| CN | 107614071 | A | 1/2018 |
| JP | H09140895 | A | 6/1997 |
| JP | 3168119 | U | 6/2011 |
| JP | 2013034666 | A | 2/2013 |
| JP | 2015144735 | A | 8/2015 |
| JP | 6049118 | B1 | 12/2016 |
| JP | 2017018501 | A | 1/2017 |
| JP | 2017124045 | A | 7/2017 |
| KR | 1020170016303 | A | 2/2017 |
| WO | 2013133414 | A1 | 9/2013 |
| WO | 2016092634 | A1 | 6/2016 |
| WO | 2017022767 | A1 | 2/2017 |
| WO | 2017086413 | A1 | 5/2017 |
| WO | 2018008095 | A1 | 1/2018 |

OTHER PUBLICATIONS

Megan Clemens, “Back to Basics, Manufacturers look to spice up traditional table games with new concepts and advanced technology”, Casino Journal (Casinojoumal.com), Aug. 2015, vol. 28, No. 8, pp. 32-36, ISSN 1535-2110.

International Search Report issued on Mar. 26, 2019 issued in PCT Application PCT/US2019/001025.

US Office Action issued on Sep. 14, 2020 issued in U.S. Appl. No. 16/261,007.

Chinese Office Action dated Dec. 29, 2020 issued in CN Application 201910091917.X.

Australian Examination Report No. 1 dated May 4, 2021 issued in AU Application 2020220141.

“Regulation Casino Size & Quality Gaming Table Layouts” (https://web.archive.org/web/20040602195113/http://casino4you.com/layoutsreg.htm) published on casino4you.com, on Jun. 2, 2004.

US Office Action dated Mar. 14, 2023 issued for U.S. Appl. No. 17/726,615.

AU Examination Report No. 2 dated Mar. 24, 2023 issued for AU application No. 2019216571.

Japanese Office Action dated Aug. 2, 2022 issued for JP application No. 2020-197169.

Australian Office Action dated Jul. 25, 2023 issued for AU application No. 2022202961.

US Office Action dated Oct. 31, 2023 issued for U.S. Appl. No. 17/726,615.

“3 Creative Design Ideas for the Cost-Conscientious Casino” by John Montgomery, published on Jul. 7, 2015 on Linkedin.com (https://www.linkedin.com/pulse/3-creativedesign-ideas-cost-conscientious-casinojohn-montgomery).

Korean Office Action dated Apr. 21, 2024 issued for KR application No. 10-2024-7010591.

Korean Office Action dated May 27, 2024 issued for KR application No. 10-2019-0009997.

* cited by examiner

TABLE GAME MANAGEMENT SYSTEM, GAMING TABLE LAYOUT, AND GAMING TABLE

CROSS REFERENCE TO RELATED APPLICATION

This application is a continuation of U.S. patent application Ser. No. 16/965,096 filed Jul. 27, 2020, which is a national phase application under 35 U.S.C. § 371 of International Application No. PCT/JP2019/001025 filed Jan. 16, 2019, which claims priority to JP Pat. App. No. 2018-27395 filed Jan. 30, 2018, the entire contents of each disclosure are hereby incorporated by reference.

FIELD

The present invention relates to a gaming table layout, a gaming table having a gaming table layout, a table game management system, and more particularly, to a gaming table layout, a gaming table having a gaming table layout, a table game management system which are capable of detecting an amount of game token bet on each of PLAYER, BANKER, TIE, PLAYER PAIR, and BANKER PAIR and particularly configured to consider the TIE, the PLAYER PAIR, and the BANKER PAIR is bet on a lot.

BACKGROUND

In game places such as casinos, attempts to detect and prevent misconduct during a game or a mistake or misconduct when a game token is bet or settled have been made.

In a gaming table layout of a related art, as disclosed in the non-patent literature 1, there are bet areas of TIE, PLAYER PAIR, and BANKER PAIR called a side bet before a dealer, and when a game participant desires to bet on the side bet, the game participant has to ask dealer to place or receive a game token. Further, in a system of a related art, a system of photographing a game token on a gaming table with a camera device or the like installed in the gaming table and recognizing a type of game token and the number of game tokens has been proposed.

PRIOR ART DOCUMENT

NON-PATENT LITERATURE 1: http://gamingconcepts-group com/2013/baccarat-table-sale/.

In game places such as casinos, a baccarat game or the like in which betting is performed in accordance with a gaming table layout or the like is performed, a game token on a gaming table is photographed with a camera device installed in the gaming table, and a type of game token and the number of game tokens are recognized. However, the gaming table layout of the related art is not a layout considered to bet on the side bet easily. When the game participant desires to bet on the side bet, the game participant has to ask the dealer, and thus there is a problem in that time and efforts to go through the dealer's hand are taken, and it is difficult to bet. Further, in the system of the related art, a difference in a bet amount on each of the PLAYER, the BANKER, the TIE, the PLAYER PAIR, and the BANKER PAIR in each gaming table layout is not detected.

SUMMARY OF THE INVENTION

The present invention was made in light of the foregoing, and it is an object of the present invention to provide a gaming table layout which is excellent and capable of evaluating whether or not a gaming table layout is excellent by photographing a game token with a camera device, recognizing a type of game token and the number of game tokens, and further calculating a ratio of an amount of money bet on a side bet.

In order to solve the above problems and achieve the above objects, the present invention provides a table game management system including a gaming table having a baccarat gaming table layout, a chip determining device capable of determining a type of game token placed on the gaming table to participate in a bet and the number of game tokens, and a control device that records the type of game token and the number of game tokens determined by the chip determining device in a database, in which the gaming table layout includes a portion on which a chip float storing the game token is placed, a portion on which a card chute device storing a playing card is placed, a card area in which the playing card withdrawn from the card chute device is placed, and a bet area in which a game participant places the game token to participate in a bet, further, as the bet area, a bet area for PLAYER, a bet area for BANKER, a bet area for TIE, a bet area for PLAYER PAIR, and a bet area for BANKER PAIR are set in a plurality of rows for each position radially centering on a dealer, and the control device is configured to detect transition of an amount of the game token bet on each of the PLAYER, the BANKER, the TIE, the PLAYER PAIR, and the BANKER PAIR independently for each player position on the basis of a record of the database.

Further, in the gaming table layout, the bet areas of the PLAYER, the BANKER, the TIE, the PLAYER PAIR, and the BANKER PAIR of each player position may be set within a range which a hand of each game participant sitting at the player position can reach.

Further, in the gaming table layout, a distance from an end of the table at a position at which the dealer sits to an end of each bet area may be within 1 m, and a distance from an end of the table at a position at which the game participant sits to an end of the bet area of each player position on which the game participant places the game token may be within 1 m.

Further, the bet area for the player, the bet area for the banker, the bet area for the TIE, the bet area for the PLAYER PAIR, and the bet area for the BANKER PAIR may be arranged in five rows in one column for each player position.

Further, the control device may be configured to detect transition of an amount of the game token bet on the PLAYER, the BANKER, the TIE, the PLAYER PAIR, and the BANKER PAIR for a plurality of gaming tables.

Further, the control device may be configured to detect transition of an amount of the game token bet on the PLAYER, the BANKER, the TIE, the PLAYER PAIR, and the BANKER PAIR for a plurality of types of gaming table layouts.

Further, the control device may be configured to calculate a ratio of an amount of the game token bet on the TIE or an amount of the game token bet on the PLAYER PAIR or the BANKER PAIR with respect to an amount of the game token bet on the player or the banker.

Further, the control device may determine whether or not the gaming table layout is excellent on the basis of the calculated ratio.

Further, the control device may be configured to calculate a theoretical earning rate based on a game record during a predetermined period of time in the gaming table layout on the basis of a theoretical earning rate of each of the PLAYER, the BANKER, the TIE, the PLAYER PAIR, and the BANKER PAIR and transition of an amount of the game token actually bet on the PLAYER, the BANKER, the TIE, the PLAYER PAIR, and the BANKER PAIR.

Further, the control device may be configured to calculate an actual earning rate in the gaming table layout on the basis of actual win-loss data in each game performed in the gaming table and transition of an amount of the game token bet on the PLAYER, the BANKER, the TIE, the PLAYER PAIR, and the BANKER PAIR.

Further, the control device may be configured to calculate a theoretical earning rate based on a game record during a predetermined period of time in the gaming table layout on the basis of a theoretical earning rate of each of the PLAYER, the BANKER, the TIE, the PLAYER PAIR, and the BANKER PAIR and transition of an amount of the game token actually bet on the PLAYER, the BANKER, the TIE, the PLAYER PAIR, and the BANKER PAIR, calculate an actual earning rate in the gaming table layout on the basis of actual win-loss data in each game performed in the gaming table and transition of an amount of the game token actually bet on the PLAYER, the BANKER, the TIE, the PLAYER PAIR, and the BANKER PAIR, and calculate a difference between the theoretical earning rate and the actual earning rate.

Further, there is no contour line in the bet area, and the bet area may be distinguished from a place of the gaming table layout by a color or a color density.

Further, a game token including a feature color specifying a type and a common color used in common to a plurality of types of game tokens may be a use target as the game token to be used, and the bet area may be colored with a color other than the common color.

Further, the gaming table layout may include a game token check area.

Further, the table game management system may further include a win-loss result determining device that determines a win-loss result of a game, and the control device may be configured to detect a balance for each player position on the basis of the win-loss result of the game determined by the win-loss result determining device.

The table game management system may further include a player specifying unit that specifies a player participating in a game at each player position by a face authentication system or a membership card.

The control device may record a membership ID of each player specified by the player specifying unit and a bet amount of each player position in the database in association with each other.

The control device may be configured to detect an amount of the bet game token and a balance for each player.

The chip determining device may be configured to separately detect a plurality of game token stacks within each bet area of each player position.

Alternatively, another aspect of the present invention provides a table game management system including a gaming table having a baccarat gaming table layout, a chip determining device capable of determining a type of game token placed on the gaming table to participate in a bet and the number of game tokens, and a control device that records the type of game token and the number of game tokens determined by the chip determining device in a database, and the gaming table layout includes a portion on which a chip float storing the game token is placed, a portion on which a card chute device storing a playing card is placed, a card area in which the playing card withdrawn from the card chute device is placed, and a bet area in which a game participant places the game token to participate in a bet, in which the control device is configured to detect transition of an amount of the game token bet on each of the PLAYER, the BANKER, the TIE, the PLAYER PAIR, and the BANKER PAIR independently for each player position on the basis of a record of the database.

Further, the control device may be configured to detect transition of an amount of the game token bet on the PLAYER, the BANKER, the TIE, the PLAYER PAIR, and the BANKER PAIR for a plurality of gaming tables.

Further, the control device may be configured to detect transition of an amount of the game token bet on the PLAYER, the BANKER, the TIE, the PLAYER PAIR, and the BANKER PAIR for a plurality of types of gaming table layouts.

Further, the control device may be configured to calculate a ratio of an amount of the game token bet on the TIE or an amount of the game token bet on the PLAYER PAIR or the BANKER PAIR with respect to an amount of the game token bet on the player or the banker.

Further, the control device may be configured to determine whether or not the gaming table layout is excellent on the basis of the calculated ratio.

Further, the control device may be configured to calculate a theoretical earning rate based on a game record during a predetermined period of time in the gaming table layout on the basis of a theoretical earning rate of each of the PLAYER, the BANKER, the TIE, the PLAYER PAIR, and the BANKER PAIR and transition of an amount of the game token actually bet on the PLAYER, the BANKER, the TIE, the PLAYER PAIR, and the BANKER PAIR, and the banker pair.

Further, the control device may be configured to calculate an actual earning rate in the gaming table layout on the basis of actual win-loss data in each game performed in the gaming table and transition of an amount of the game token actually bet on the PLAYER, the BANKER, the TIE, the PLAYER PAIR, and the BANKER PAIR.

Further, the control device may be configured to calculate a theoretical earning rate based on a game record during a predetermined period of time in the gaming table layout on the basis of a theoretical earning rate of each of the PLAYER, the BANKER, the TIE, the PLAYER PAIR, and the BANKER PAIR and transition of an amount of the game token actually bet on the PLAYER, the BANKER, the TIE, the PLAYER PAIR, and the BANKER PAIR, and the banker pair, calculate an actual earning rate in the gaming table layout on the basis of actual win-loss data in each game performed in the gaming table and transition of an amount of the game token actually bet on the PLAYER, the BANKER, the TIE, the PLAYER PAIR, and the BANKER PAIR, and calculate a difference between the theoretical earning rate and the actual earning rate.

Further, the control device may have a function of analyzing a relation between the theoretical earning rate or the actual earning rate and a period of time taken to perform a game.

Further, the control device may have a function of analyzing a relation of the theoretical earning rate or the actual earning rate, a period of time taken to perform a game, and the number of game participants participating in a game.

The table game management system may further include a win-loss result determining device that determines a win-loss result of a game, and the control device may be configured to detect a balance for each player position on the basis of the win-loss result of the game determined by the win-loss result determining device.

The table game management system may further include a player specifying unit that specifies a player participating in a game at each player position by a face authentication system or a membership card.

The control device may record a membership ID of each player specified by the player specifying unit and a bet amount of each player position in the database in association with each other.

The control device may be configured to detect an amount of the bet game token and a balance for each player.

The chip determining device may be configured to separately detect a plurality of game token stacks within each bet area of each player position.

Further, another aspect of the present invention provides a baccarat gaming table layout including a portion on which a chip float storing a game token is placed, a portion on which a card chute device storing a playing card is placed, a card area in which the playing card withdrawn from the card chute device is placed, and a bet area in which a game participant places the game token to participate in a bet, in which further, as the bet area, a bet area for PLAYER, a bet area for BANKER, a bet area for TIE, a bet area for PLAYER PAIR, and a bet area for BANKER PAIR are set in a plurality of rows for each position radially centering on a dealer, and the bet areas of the PLAYER, the BANKER, the TIE, the PLAYER PAIR, and the BANKER PAIR of each player position are set within a range which a hand of each game participant sitting at the player position can reach.

Further, in the gaming table layout, a distance from an end of the table at a position at which the dealer sits to an end of each bet area may be within 1 m, and a distance from an end of the table at a position at which the game participant sits to an end of the bet area of each player position on which the game participant places the game token may be within 1 m.

Further, in the gaming table layout, the bet area for the player, the bet area for the banker, the bet area for TIE, the bet area for PLAYER PAIR, and the bet area for BANKER PAIR may be arranged in five rows in one column for each player position.

Further, in the gaming table layout, there is no contour line in the bet area, and the bet area may be distinguished from a place of the gaming table layout by a color or a color density.

Further, in the gaming table layout, a game token including a feature color specifying a type and a common color used in common to a plurality of types of game tokens may be a use target as the game token to be used, and the bet area may be colored with a color other than the common color.

Further, the gaming table layout may include a game token check area.

Further, a gaming table may include the gaming table layout set on a top surface thereof.

According to the present invention, it is possible to correctly recognize a game token without confusion with a layout pattern when a game token is recognized using an image captured by a camera device and thereby improve accuracy of scanning a game token with a camera device through a table game management system including a gaming table having a baccarat gaming table layout, a chip determining device capable of determining a type of game token placed on the gaming table to participate in a bet and the number of game tokens, and a control device that records the type of game token and the number of game tokens determined by the chip determining device in a database, in which the gaming table layout includes a portion on which a chip float storing the game token is placed, a portion on which a card chute device storing a playing card is placed, a card area in which the playing card withdrawn from the card chute device is placed, and a bet area in which a game participant places the game token to participate in a bet, further, as the bet area, a bet area for PLAYER, a bet area for BANKER, a bet area for TIE, a bet area for PLAYER PAIR, and a bet area for BANKER PAIR are set in a plurality of rows for each position radially centering on a dealer, and the control device is configured to detect transition of an amount of the game token bet on each of the PLAYER, the BANKER, the TIE, the PLAYER PAIR, and the BANKER PAIR independently for each player position on the basis of a record of the database.

EMBODIMENTS FOR CARRYING OUT THE INVENTION

Hereinafter, a gaming table layout according to the invention will be described in detail with reference to the appended drawings. In the following embodiment, a gaming table for baccarat will be described as an example of a gaming table, but the present invention is not limited by this embodiment. Further, constituent elements in the following embodiments include those which can be easily assumed by those skilled in the art or substantially the same ones.

Figure 1:
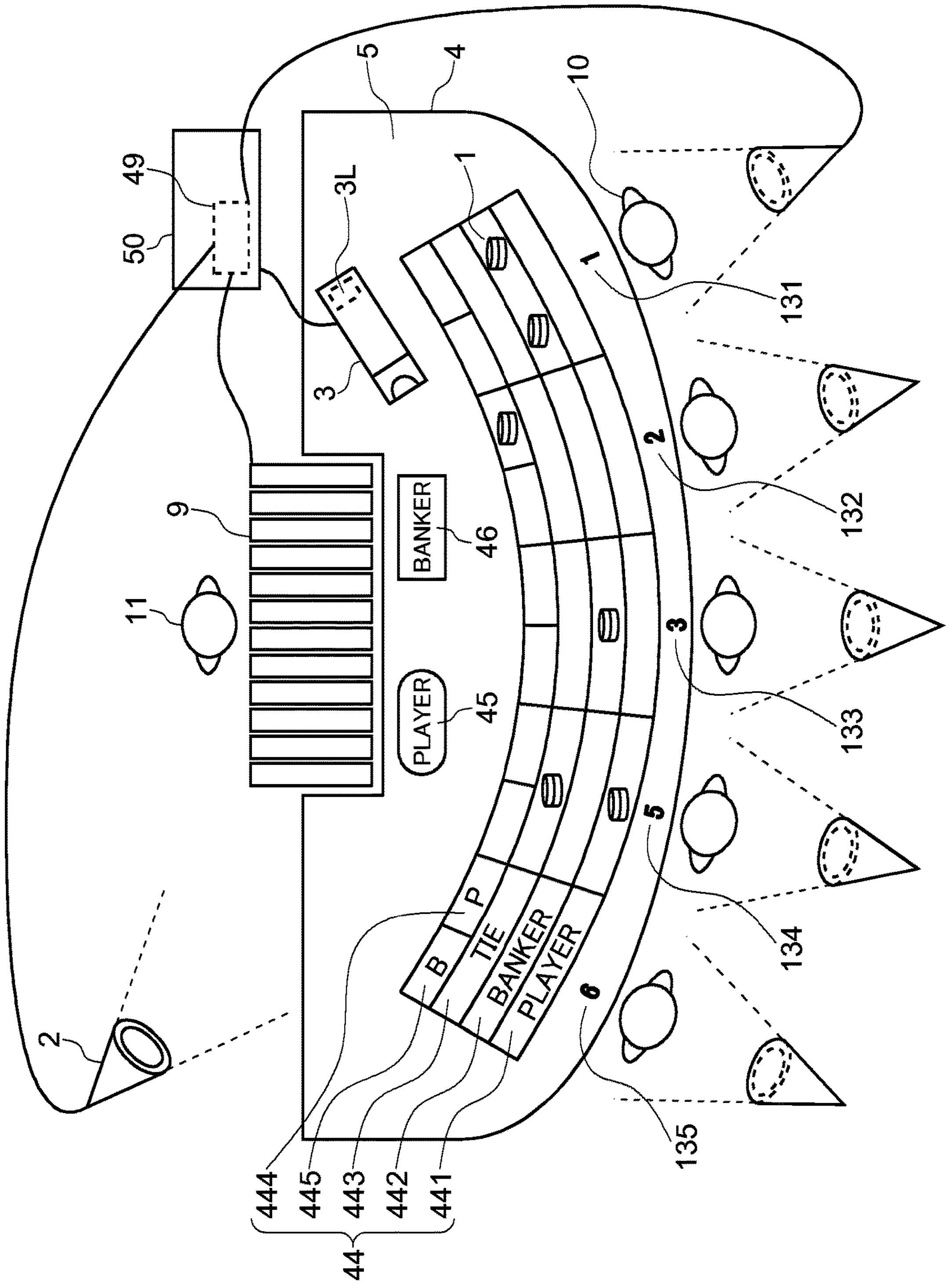
FIG. 1 is a top view illustrating a layout of a gaming table according to an embodiment of the present invention.

FIG. 1 is a top view illustrating a gaming table layout 5 according to an embodiment of the present invention. In FIG. 1, a gaming table 4 is a baccarat table, and the gaming table layout 5 is attached to the top surface of the gaming table 4. The gaming table layout 5 includes five player positions 13 (a "player position 1" 131, a "player position 2" 132, a "player position 3" 133, a "player position 5" 134, and a "player position 6" 135), and five game participants 10 can participate in the game. A bet area 44 is set for each player position 13. The bet area 44 of the player position 13 includes areas of a player (PLAYER) 441, a banker (BANKER) 442, a tie (TIE) 443, a player pair (P) 444, and a banker pair (B) 445. Each game participant 10 puts a bet by placing game tokens 1 of an amount to bet on a position corresponding to a bet target. The gaming table 4 further includes a player card area 45 on which a drawn player card is placed and a banker card area 46 on which a drawn banker card is placed.

The gaming table 4 includes a game token tray 9 which a dealer 11 inserts the game token 1. At least a part of the game token tray 9 is embedded in the gaming table 4. A chip determining device 49 can detect a position of the game token 1, a type of game token 1, the number of game tokens 1 in the game token tray 9 on the basis of information acquired from a camera device 2, a RFID reader (not illustrated), and the like.

A card distributing device 3 determines a win-loss result of the game in the gaming table 4 as a win-loss result determining device and displays it in a result display lamp 3L. Further, the card distributing device 3 transmits the determined win-loss result of the game to a control device 50.

The chip determining device 49 can determine the type of game token 1, the number of game tokens 1, the position (bet target) at which the game token 1 is placed on the gaming table 4 on the basis of information obtained from the camera device 2, the RFID reader, and the like. The control device 50 has a function of detecting the position of the game token 1, the type of game token 1, and the number of game tokens 1 on the gaming table 4 determined by the chip determining device 49 and performs a balance calculation of a casino side in the gaming table 4 using the win-loss result obtained from the card distributing device 3 serving as the win-loss determining device. The control device 50 can determine whether or not the balance calculation result of the casino side and the change in the position of the game token 1, the type of game token 1, and the number of game tokens 1 in the game token tray 9 obtained by the chip determining device 49 are correct. The control device 50 records the type of game token 1, the number of game tokens 1, and the position (betting target) of the game token 1 placed on the bet area 44 which are determined by the chip determining device in the database.

On the basis of the record of the database, a control device 50 can detect transition of an amount of game token 1 bet on each of the PLAYER 441, the BANKER 442, the TIE 443, the PLAYER PAIR 444, and the BANKER PAIR 445 independently. The control device 50 that detects the transition as described above may be a device separate from the control device 50 described above.

Among the PLAYER 441, the BANKER 442, the TIE 443, the PLAYER PAIR 444, and the BANKER PAIR 445, the casino side earning rate of the tie, the player pair, and the banker pair called the side bet is overwhelmingly higher than that of the player and the banker, and thus the casino side is likely to get more profits when more bets are put on the side bet. Therefore, the gaming table layout 5 configured so that a large bet amount is put on the side bet is regarded as being excellent.

In other words, the control device 50 can calculate a ratio of the bet amount on the side bet for each gaming table layout 5 on the basis of the record of the database and evaluate the excellence of the gaming table layout 5.

Figure 6:
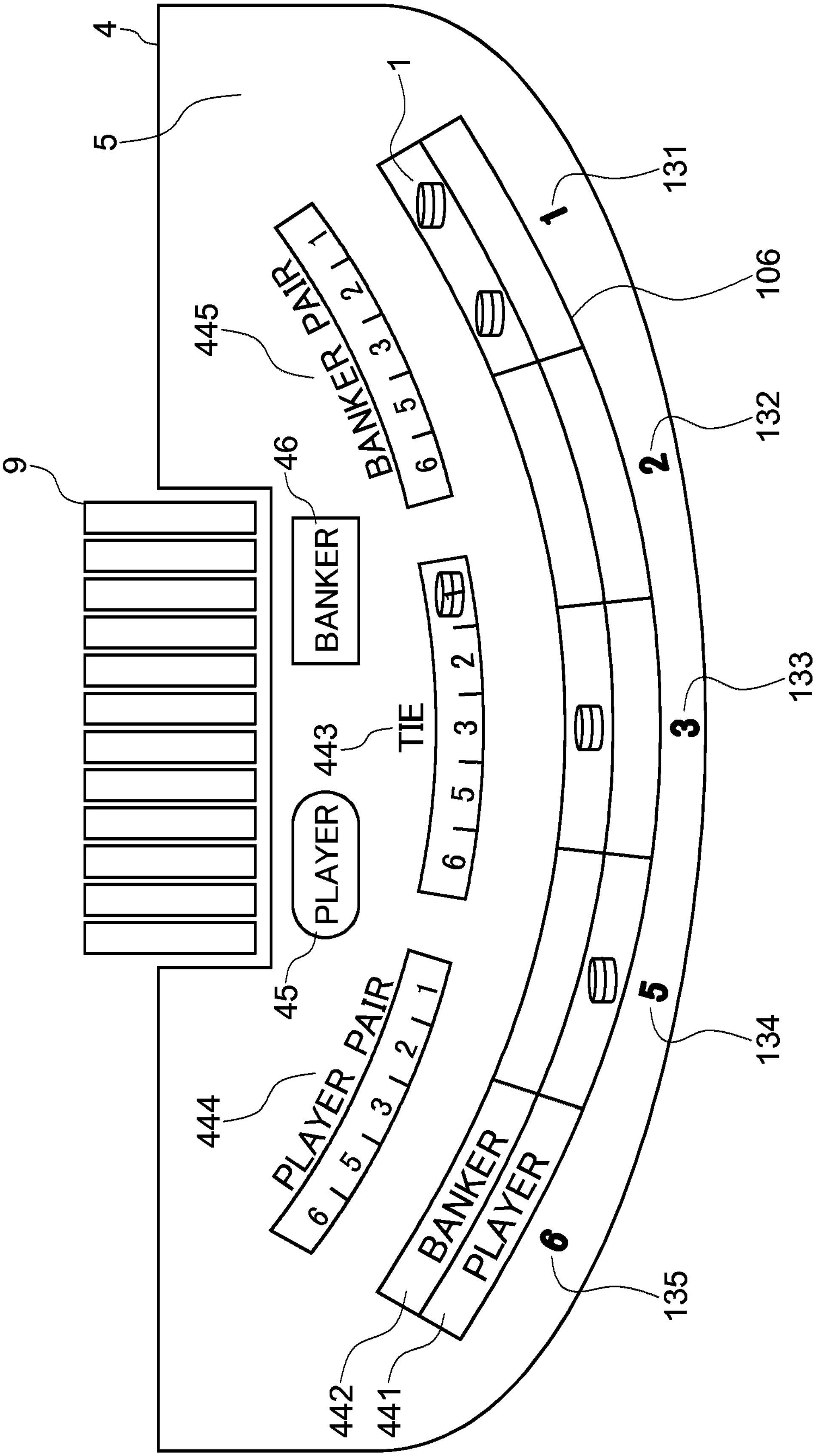
FIG. 6 is a top view illustrating an example of a layout of a gaming table according to a related art.

In the gaming table layout 5 of the related art, the PLAYER 441 and the BANKER 442 are provided for each player position 13, but the side bets of the TIE 443, the PLAYER PAIR 444, and the BANKER PAIR 445 are collectively arranged at the center of the table as illustrated in FIG. 6. In the gaming table layout 5, for example, when the game participant 10 at the player position 1 desires to bet on the player pair, since the hand of the game participant 10 does not reach it, the game participant 10 has to bet through the hand of the dealer 11. As a result, the game participant 10 hesitates to bet on the side bet, and an amount bet on the side bet decreases. Further, due to the time and efforts of the dealer 11, it takes time, and the efficiency gets worse, and when the dealer 11 is distracted, there is room for misconduct to intervene.

In the gaming table layout 5 of the present invention, the bet areas 44 each including the PLAYER 441, the BANKER 442, the TIE 443, the PLAYER PAIR 444, and the BANKER PAIR 445 are set in a plurality of rows so that each bet area 44 corresponds to the player position 13 at which each game participant 10 as illustrated in FIG. 1, so that each game participant 10 can bet on the side bets of the TIE 443, the PLAYER PAIR 444, and the BANKER PAIR 445 by him/herself. With this gaming table layout 5, each game participant 10 can place the game token 1 on the bet area 44 of the side bet with his/her hand without going through the hand of the dealer 11, and thus it is easier to bet on the side bet. As a result, as the amount bet on the side bet in which the casino side earning rate is high increases, the casino side profit increases. Further, it is possible to reduce the time since it does not go through the hand of the dealer 11, and thus there is an advantage that the efficiency is improved.

More specifically, since each bet area 44 is arranged within a range which the hand of each game participant 10 sitting at the player position 13 can reach, that is within 1 m from the end of the table at the position at which each game participant 10 sits, each game participant 10 can put a bet easily.

Figure 2:
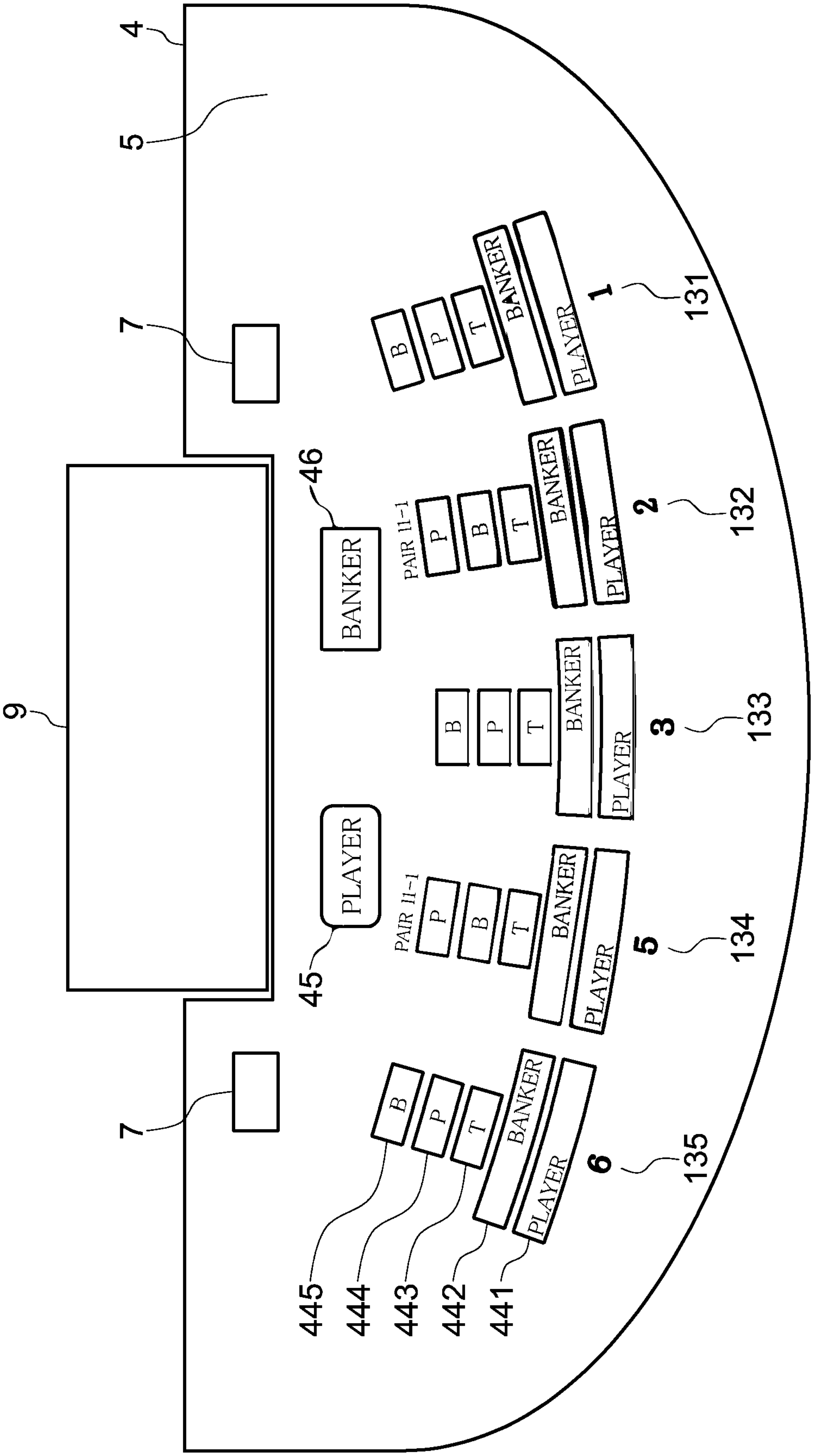
FIG. 2 is a top view illustrating a layout of a gaming table according to another embodiment of the present invention.

Further, as illustrated in FIG. 2, the bet areas 44 of the PLAYER 441, the BANKER 442, the TIE 443, the PLAYER PAIR 444, and the BANKER PAIR 445 may be arranged in five rows in one column for each player position 13. In this case, similarly, since each game participant 10 can bet with his/her own hand, the bet amount on the side bet increases. Further, since the bet areas 44 of the PLAYER 441, the BANKER 442, the TIE 443, the PLAYER PAIR 444, and the BANKER PAIR 445 are lined up in a horizontal row, there is an advantage in that payment and collection of the game token 1 by the dealer 11 can be performed smoothly. Further, for example, the order of the bet areas 44 may be changed, for example, by setting TIE 443 to the front. Since the bet area of the side bet is arranged in front, the game participant 10 can easily bet on the side bet.

The control device 50 can detect the transition of the amount of the game token 1 bet on the PLAYER 441, the BANKER 442, the TIE 443, the PLAYER PAIR 444, and the BANKER PAIR 445 recorded in the databases of a plurality of gaming tables 4 and performs a comparison for a plurality of gaming tables 4.

Further, the control device 50 can detect the amount of the game token 1 bet on the PLAYER 441, the BANKER 442 and the TIE 443, the PLAYER PAIR 444, and the BANKER PAIR 445 recorded in the databases of a plurality of types of gaming table layouts 5 and perform a comparison for a plurality of gaming table layouts 5.

The control device 50 can calculate the ratio of the amount of game token 1 bet on the tie or the ratio of game token 1 bet on the player pair or the banker pair with respect to the amount of game token 1 bet on the player or the banker. The control device 50 can determine whether or not the gaming table layout 5 is excellent on the basis of the calculated ratio.

It is possible to develop the more excellent gaming table layout 5 having the high bet amount on the side bet by repeating an operation of changing the gaming table layout 5, calculating the ratio of the amount of game token 1 bet on the tie or the ratio of game token 1 bet on the player pair or the banker pair with respect to the amount of game token 1 bet on the player or the banker, and evaluating the excellence.

Further, the control device 50 can further calculate a theoretical earning rate based on an actual game record during a predetermined period of time in the gaming table layout 5 on the basis of a theoretical earning rate of each of the PLAYER 441, the BANKER 442, the TIE 443, the PLAYER PAIR 444, and the BANKER PAIR 445 and the transition of the amount of game token 1 actually bet on the PLAYER 441, the BANKER 442, the TIE 443, the PLAYER PAIR 444, and the BANKER PAIR 445. The theoretical earning rate is an earning rate based on the win-loss result when a playing card is withdrawn randomly, and an approximate value is 1.3% for the player and the banker, 14% for the tie, and 10% for the player pair and the banker pair. In practice, it is possible to calculate the theoretical earning rate based on the best amount during a predetermined period of time by multiplying the amount of game token 1 bet on each of the PLAYER 441, the BANKER 442, the TIE 443, the PLAYER PAIR 444, and the BANKER PAIR 445 by the theoretical earning rate, and it is possible to evaluate the excellence of the gaming table layout 5.

The control device 50 can calculate an actual earning rate in the gaming table layout 5 on the basis of actual win-loss data in each game performed in the gaming table 4 and the transition of the amount of the game token 1 bet on the PLAYER 441, the BANKER 442, the TIE 443, the PLAYER PAIR 444, and the BANKER PAIR 445. It is possible to calculate a stricter actual earning rate using the win-loss data of the game which is actually performed.

Further, the control device 50 can further calculate the theoretical earning rate based on a game record during a predetermined period of time in the gaming table layout 5 on the basis of the theoretical earning rate of each of the PLAYER 441, the BANKER 442, the TIE 443, the PLAYER PAIR 444, and the BANKER PAIR 445 and the transition of the amount of the game token 1 actually bet on the PLAYER 441, the BANKER 442, the TIE 443, the PLAYER PAIR 444, and the BANKER PAIR 445, calculate an actual earning rate in the gaming table layout 5 on the basis of the actual win-loss data in each game performed in the gaming table 4 and the transition of the amount of the game token 1 actually bet on the PLAYER 441, the BANKER 442, the TIE 443, the PLAYER PAIR 444, and the BANKER PAIR 445, and calculate a difference between the theoretical earning rate and the actual earning rate. As the difference between the theoretical earning rate and the actual earning rate is calculated, it is possible to determine whether or not it is an unnatural result or investigate whether or not there has been misconduct or fraud.

Further, the control device 50 can further record a period of time taken to perform each game in the database. The control device 50 can analyze a relation between a period of time and a profit such as an earning rate or an earning amount per unit time on the basis of the record of the database.

Further, the control device 50 can further record the number of game participants 10 participating in a game in the database. The control device 50 can analyze a relation between a period of time and the number of persons such as an earning rate or an earning amount per unit time or unit number of persons on the basis of the record of the database.

In a case in which the game token 1 placed on the gaming table 4 is scanned with the camera device 2, the camera device 2 is installed obliquely above the gaming table 4 and photographs the bet area 44. The camera device 2 can recognize the game token bet for each player position. A plurality of camera devices 2 may be installed for each player position 13, or a single camera device 2 may photograph the bet areas 44 of all the player positions 13.

The control device 50 recognizes the position (bet target) of the game token 1 placed in the bet area 44, the type of game token 1, and the number of game tokens 1 the image captured by the camera device 2. It is possible to recognize the position (bet target) of the game token 1 by performing a setting in which the position (bet target) of the game token 1 can be determined on the basis of a position at which the game token 1 at the bottom among a plurality of stacked game tokens 1 is shown in a captured image in advance.

In a case in which a plurality of game token 1 stacks (stacked game tokens 1) are placed in each bet area 44 of each player position 13, the chip determining device 49 can individually recognize each stack. This is effective, for example, when the gaming table 4 is fully attended, and an action called "back bet" in which a player standing behind a chair puts a bet is performed. In other words, a player A sitting in a chair at a player position "2" 132 places the game token 1 on a bet area 442 for a banker, and a player B standing behind the player A places the game token 1 on the bet area 442 for the banker at the same player position "2" and puts a bet. At this time, the chip determining device 49 can separately determine the stacks of game tokens 1 which the player A and the player B place on the same bet area separately.

The chip determining device 49 can analyze an image captured by the camera device 2 and individually determine the stacks by recognizing the stacks from a distance between the game tokens 1 or an overlapping state. Further, the chip determining device 49 may be an RFID reader, and when a plurality of RFID antennas are arranged in one bet area, the stack of game tokens 1 placed close to each other can be individually read by another RFID antenna.

Further, the chip determining device 49 can recognize a player who puts each game token 1 further using information identifying the game participant 10, a time at which the game token is placed, and timing information. A player specifying system may be used in order to identify the game participant 10. The player specifying system may be a face authentication system that specifies the game participant 10 registered in advance (hereinafter also referred to as a "member") by performing authentication on a face image or may be a system that specifies a member by scanning a membership card issued to a member. Each member is managed by the membership ID issued uniquely to each member.

In the present embodiment, as illustrated in FIG. 2, there is not a contour line 106 in the bet area 44, and the bet areas 44 are configured to be distinguished from the place of the gaming table layout 5 by a color or a color density. Since the contour line 106 is set in the gaming table 4 of the related art as illustrated in FIG. 6, the contour line 106 (which is usually a white line) overlaps with a white portion of the game token 1, so that the game token 1 is likely to be misidentified. Since there is rather no contour line 106, it is possible to accurately recognize only the game token 1, and it is possible to improve the accuracy of scanning.

Figure 8:
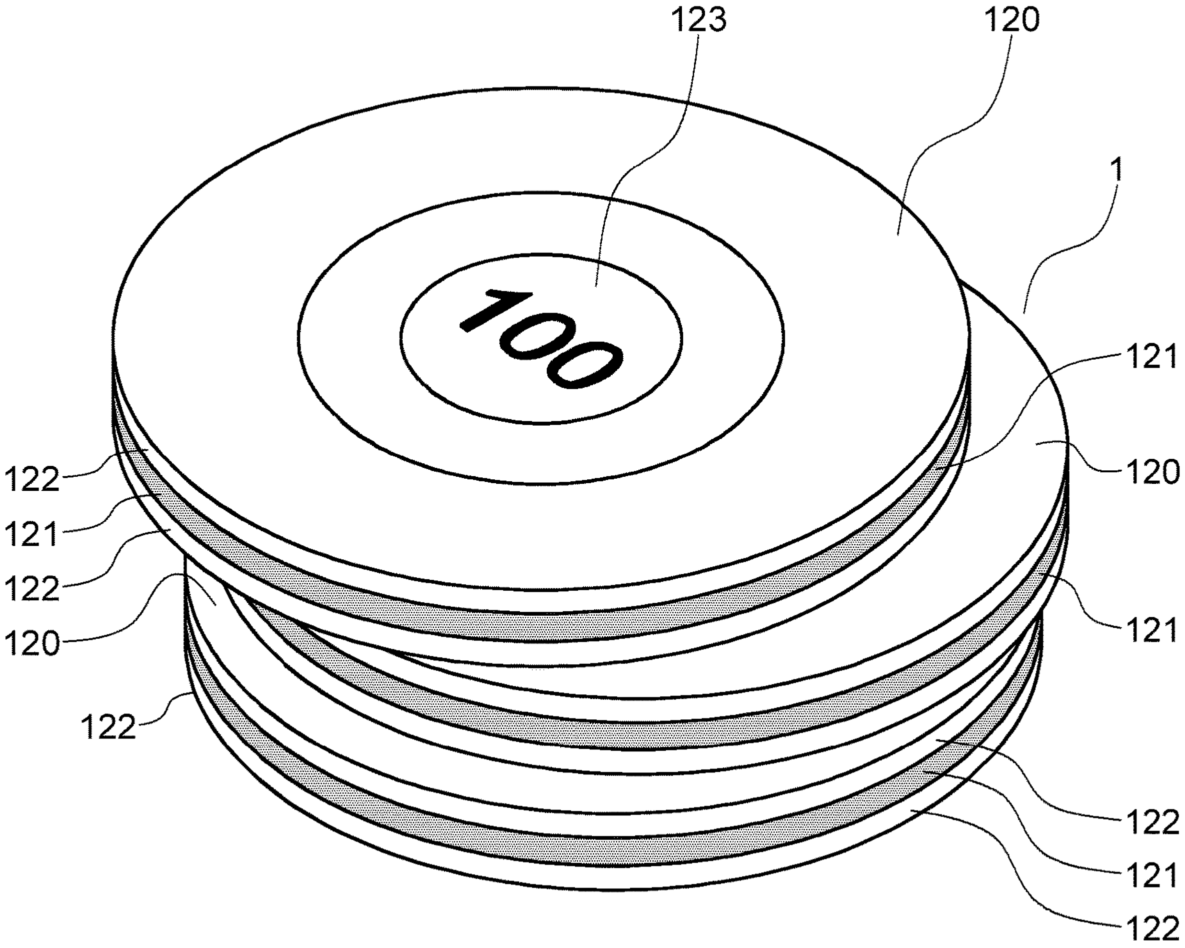
FIG. 8 is a view illustrating an example of a game token.

As illustrated in FIG. 8, for example, the game token 1 includes a common color 122 which is commonly used for a plurality of types of game tokens 1 and a feature color 121 specifying each type using a color thereof. For example, the common color 122 is white, and as the feature color 121, for example, red indicates 100 thousand dollars, and blue indicates 500 thousand dollars. The control device 50 can recognize a portion having the feature color 121 interposed by the common colors 122 as the game token 1 and identify the type of game token 1 using, for example, a method of identifying the feature color 121 from a relative color relation with reference to the common color 122. Therefore, if there is a common color 122 on the layout, there is a problem in that erroneous recognition occurs due to confusion with the game token 1, similarly to the case of the contour line 106. In this regard, in the present embodiment, the layout is colored with a color other than the common color 122, and the common color 122 is excluded from the layout, and thus the common color 122 and the feature color 121 included in the game token 1 can be easily distinguished from the gaming table layout 5, thereby improving the accuracy of scanning the game token 1.

In the present embodiment, further, display indicating the player (PLAYER) 441, the banker (BANKER) 442, the tie (TIE) 443, the player pair (P) 444, or the banker pair (B) 445 in the bet area 44 is colored with the same color (for example, yellow, green, or the like) or the same color with a different density as the color of the place of the gaming table layout 5. By making the number of colors of the portion in which the game token 1 is scanned with the camera device 2 as small as possible, it is easy to distinguish the common color 122 and the feature color 121 of the game token 1 from the gaming table layout 5, and it is possible to increase the accuracy of recognition of the game token 1.

In the gaming table layout 5 of the related art (FIG. 6), as a further problem, since the bet areas 441 to 445 are closely adjacent to each other, there is a problem in that the game tokens 101 bet by the game participants 10 are placed close to one another, and visibility is lowered when photographing is performed with a single camera device.

In the present embodiment, as illustrated in FIG. 2, the five bet areas 441 to 445 are radially arranged in a plurality of rows centering on the dealer 11 for each player position 13. In other words, since the game tokens 1 are lined up in a straight line, even when photographing is performed obliquely downwards with a single camera device 2, a situation in which the game token 1 becomes a blind spot of other game tokens 1 and is invisible does not happen.

Further, in the present embodiment, the bet areas 44 are arranged in a plurality of rows with a space therebetween so that the field of views for the game tokens 1 in a direction perpendicular to a radial straight line from the dealer 11 do not overlap, and thus no blind spot occurs in the bet areas 44 of the different player positions 13 ("1" to "6").

Further, a game token counter area 7 may be set as illustrated in FIG. 2. The RFID reader is embedded in the game token counter area 7, and thus it is possible to recognize the type of game token 1 and the number of game tokens 1 by scanning an RFID installed in the game token 1 placed on the game token counter area 7.

For example, in a case in which recognition for the game token 1 based on an image captured by the camera device 2 is not performed normally, it can be used for the purpose of recognizing the game token 1 when the dealer 11 places the game token 1 on the game token counter area 7.

Further, the game token 1 placed on the game token counter area 7 may be photographed and recognized by a camera device (which may be identical to the camera device 2 or may be another camera device). When the game token 1 is recognized by both the RFID reader and the camera device, it is possible to discover an illegal game token 1 such as a game token 1 with no RFID therein.

Figure 3:
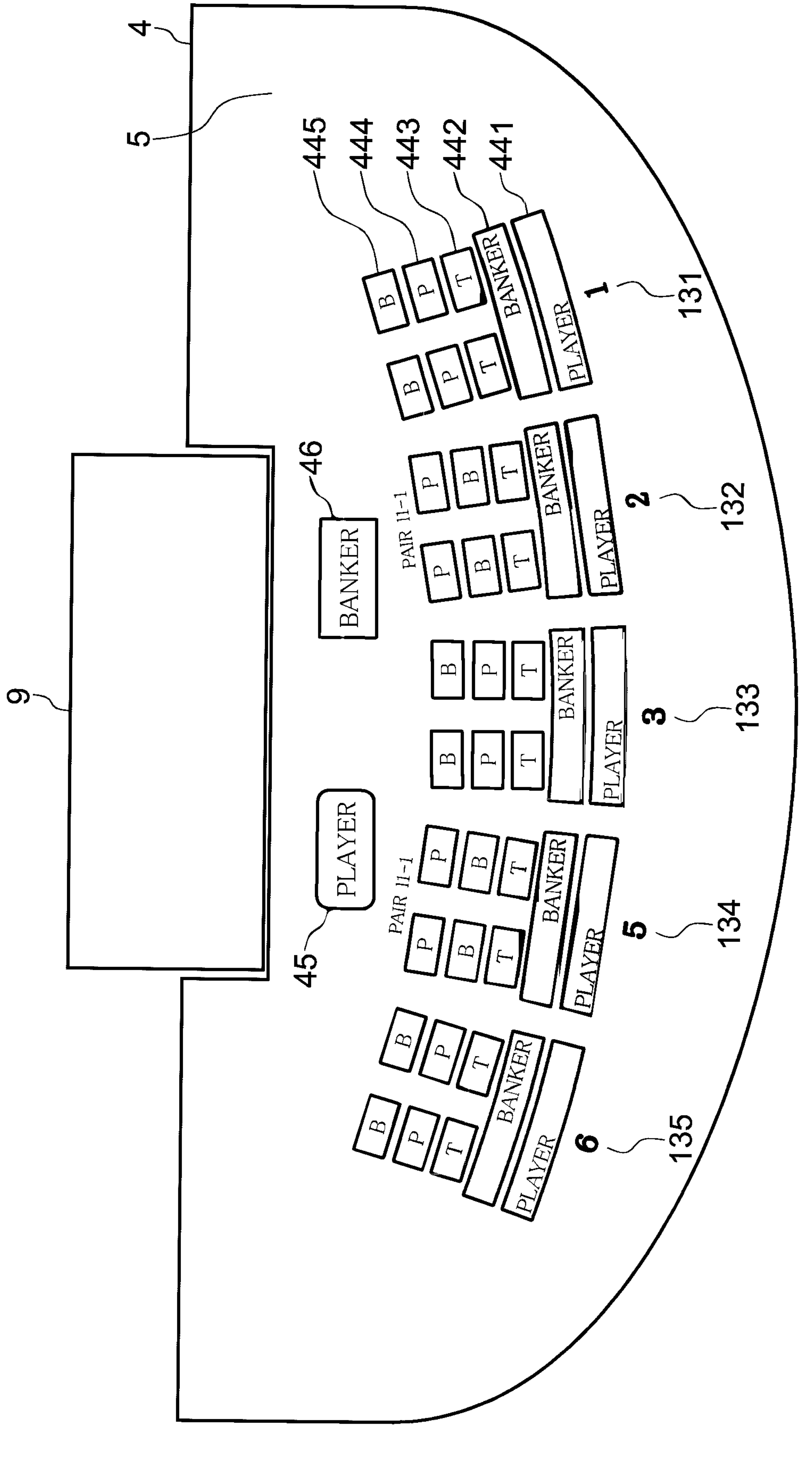
FIG. 3 is a top view illustrating a layout of a gaming table according to another embodiment of the present invention.

FIG. 3 illustrates an example in which the bet areas are arranged in a plurality of rows with a space therebetween so that the field of views for the game tokens 1 in a direction perpendicular to a radial line centering on the dealer 11 do not overlap, particularly, for the tie (TIE) 443, the player pair (P) 444, and the banker pair (B) 445 at the same player position 13 ("1" to "6").

Figure 4:
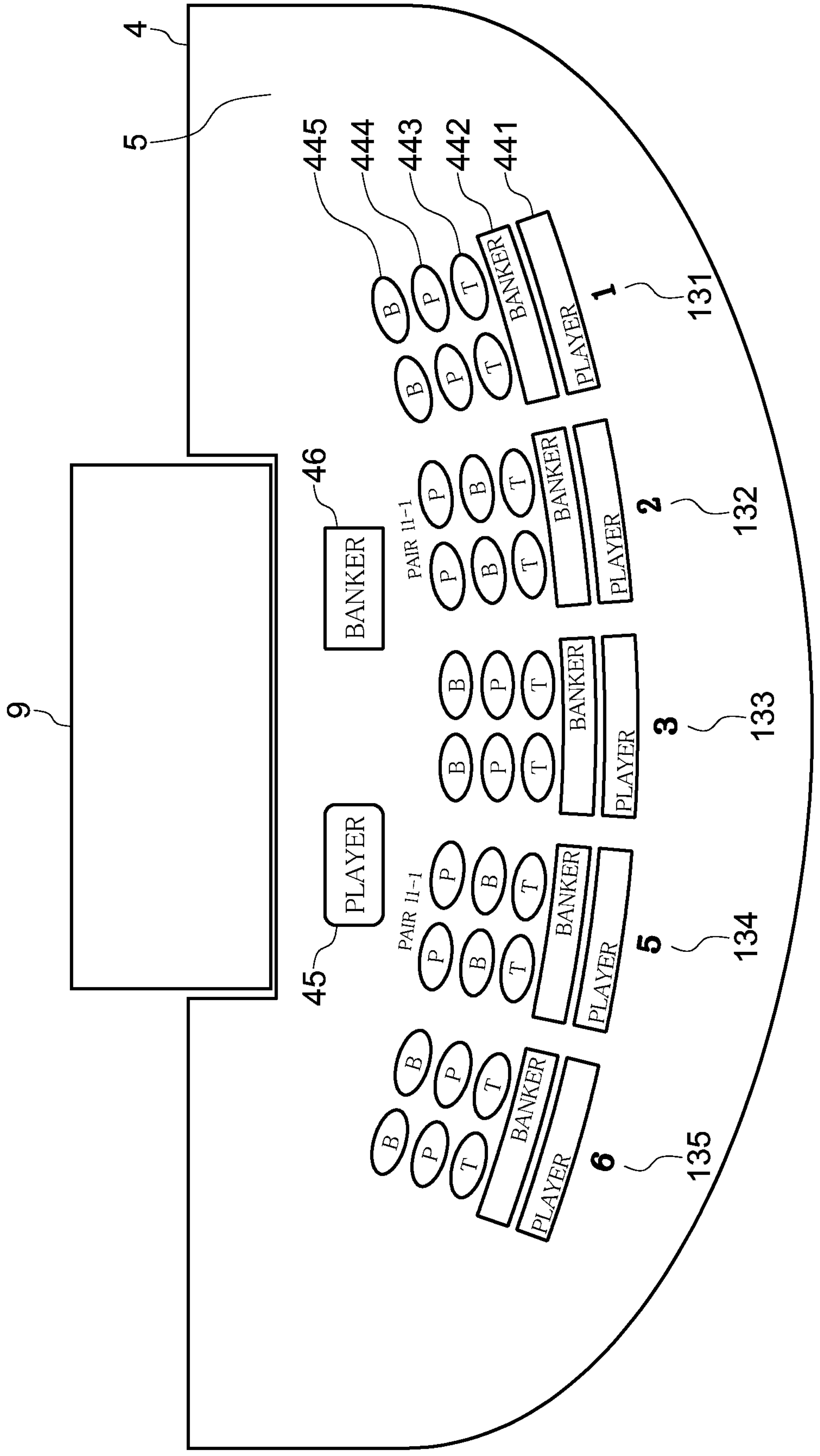
FIG. 4 is a top view illustrating a layout of a gaming table according to another embodiment of the present invention.

FIG. 4 illustrates an example in which, particularly, the tie (TIE) 443, the player pair (P) 444, and the banker pair (B) 445, which normally have square shapes, have elliptical shapes.

Figure 5:
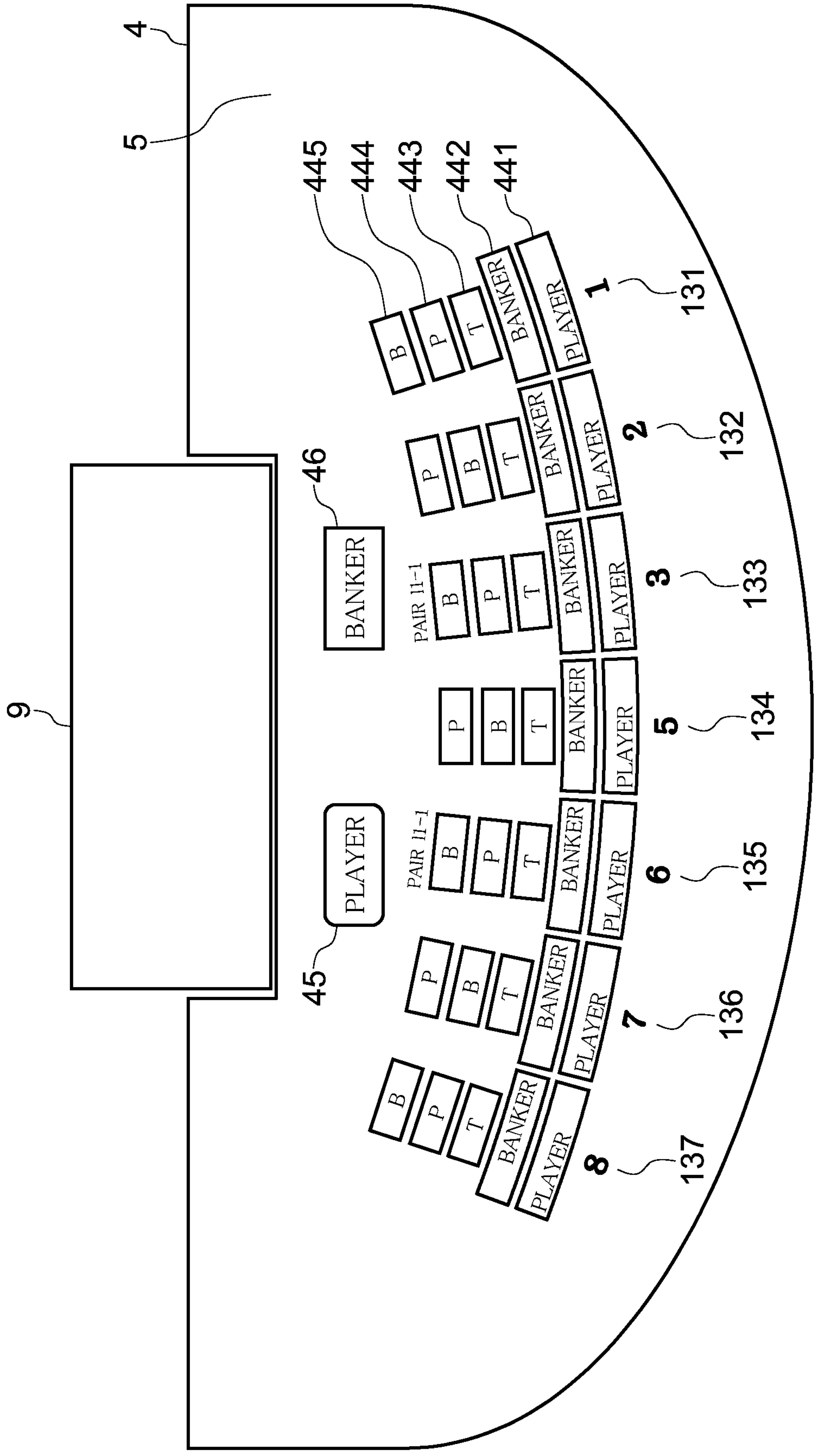
FIG. 5 is a top view illustrating a layout of a gaming table according to another embodiment of the present invention.

FIG. 5 illustrates an example of a layout in which the game participants 10 are seven people. In addition to the "player positions 1 to 6" 131 to 135, a "player position 7" 136 and a "player position 8" 137 are set.

Figure 7:
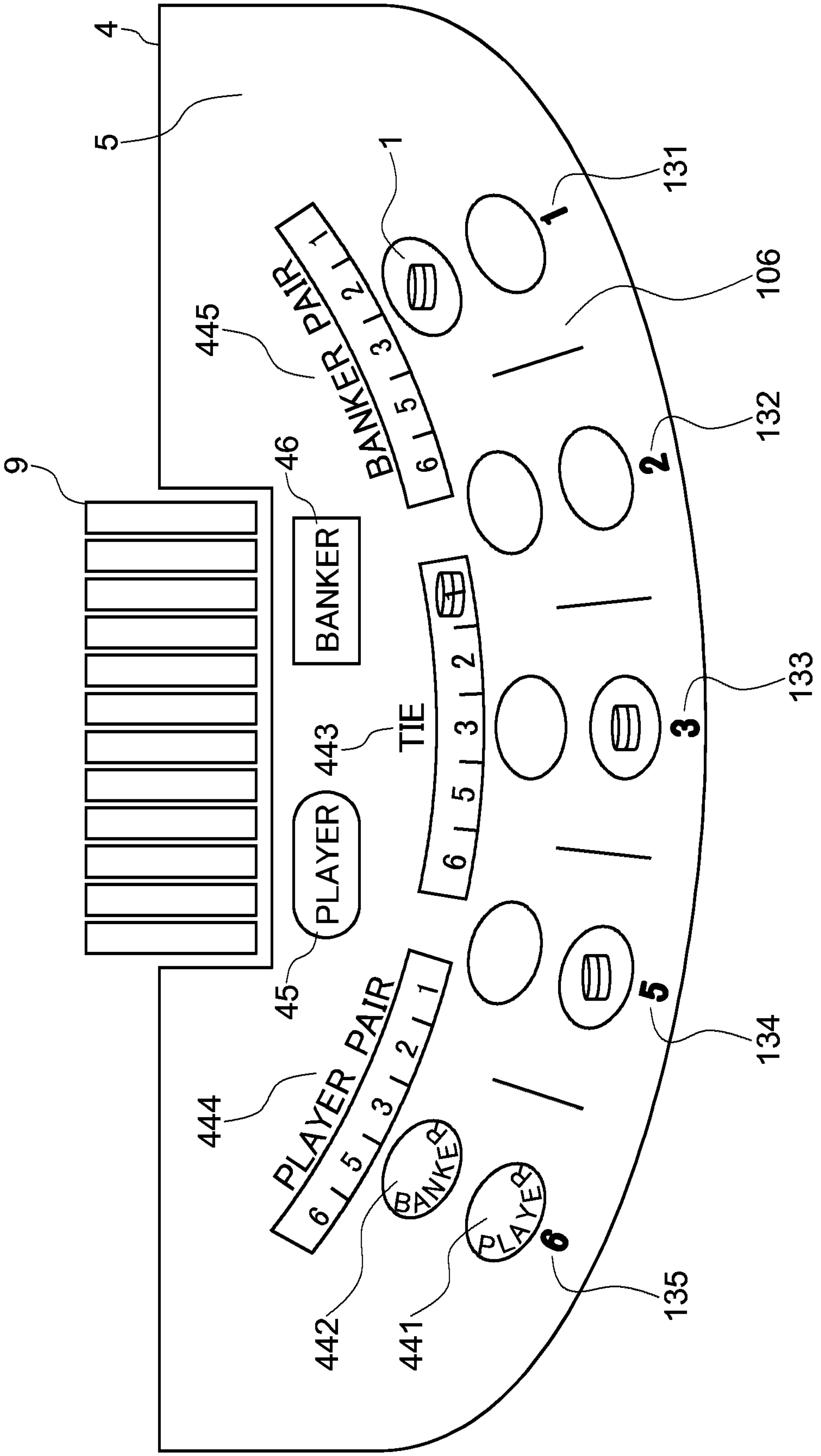
FIG. 7 is a top view illustrating an example of a layout of a gaming table according to a related art.

FIG. 7 is an example of a gaming table layout 1 in which the bet game token 1 is scanned by RFID. The bet areas 44 may be separated from each other so that RFID antennas do not interfere with each other.

It is desirable that the gaming table layout 5 be formed on the upper surface of the gaming table 4, and the gaming table layout 5 may be printed on a cloth or the like and attached to the gaming table 4, or the gaming table layout 5 may be formed directly on the gaming table 4 by coloring.

In the above example, the type of game token 1 and the number of game tokens 1 are recognized on the basis of the image captured by the camera device 2, but the type of game token 1 and the number of game tokens 1 may be recognized on the basis of a video using a video surveillance device instead of the camera device 2.

The control device 50 which recognizes the game token 1 may be a device employing artificial intelligence of a deep learning structure.

Further, by using the gaming table layout 5 of the invention, in addition to the recognition of the game token 1 using the camera device 2, even when the dealer 11 distinguishes the game token 1 with the eyes, it is easy to distinguish it, and reduction of mistakes and improvement of the game efficiency can be expected.

While various kinds of embodiments of the present invention have been described above, it should be understood that the above-described embodiments can be modified by those skilled in the art within the scope of the present invention, and the present embodiment may be appropriately modified depending on necessity in a game to be applied.

According to the above embodiment, the following inventions are disclosed.

(1) A table game management system, including: a game table having a baccarat game table layout; a plurality of RFID antennas that detect an RFID of a game token placed on a predetermined area on the game table; and a control device that records a type of game token and the number of game tokens detected by the RFID antennas in a database, in which the game table layout includes a bet area on which a game participant places the game token to participate in a bet within a predetermined area, further, as the bet area, a bet area for a player, a bet area for a banker, a bet area for a tie, a bet area for a side bet are arranged for each player position, the plurality of RFID antennas are settable such that every one or two or more antennas scan the game token of any one among the bet area for the player, the bet area for the banker, and the bet area for the side bet, and the control device specifies a type of game token and the number of game tokens detected by the one or two or more antennas associated with each bet area for each of the bet area for the player, the bet layer for the banker, and the bet area for the side bet associated with the RFID antennas and performs a setting so that the RFID associated with an area other than the bet areas does not perform detection, or a detection result thereof is excluded.

In the table game management system of (1), a betting chip is read by an RFID, and an antenna is embedded in a place in which the betting chip is not read.

(2) A table game management system, including: a game table having a baccarat game table layout; a chip determining device that determines a game token bet by each game participant in a game performed on the game table using an RFID attached to the game token; a game recording device that records the game token bet by each game participant as an image through a camera; an image analysis device that performs image analysis on an image of the recorded game token; and a control device that determines a type of game token and the number of game tokens detected by the chip determining device and the image analysis device, the game table layout includes a bet area in which the game participant places the game token to participate in a bet, further, as the bet area, a bet area for a player, a bet area for a banker, a bet area for a tie, a bet area for a side bet are arranged for each player position, the control device determines an authenticity of the bet game token for each player position on the basis of a determination result of the chip determining device, and determines a total amount for each player position, and further, the control device is configured to detect the type of game token and the number of game tokens which are independently bet on each of the bet area for the player, the bet area for the banker, the bet area for the tie, a bet area for a player pair, and a bet area for a banker pair on the basis of an image analysis result by the image analysis device.

(3) The table game management system according to (2), in which the control device determines whether or not there is a difference between a total amount of the game tokens for each player position obtained using a detection result of the chip determining device and a total amount of the game tokens obtained for each player position obtained using a detection result of the image analysis device.

In the table game management system of (2) or (3), the betting chip is read for each player using an RFID, and a place (bet area) is viewed with a camera.

DESCRIPTION OF THE REFERENCE NUMERALS

| | | | |
|---|---|---|---|
| 1, | Game token | 44, | Bet area |
| 2, | Camera device | 441, | Player |
| 3, | Card distributing device | 442, | Banker |
| 4, | Gaming table | 443, | Tie |
| 5, | Gaming table layout | 444, | Player pair |
| 7, | Game token counter area | 445, | Banker pair |
| 9, | Game token tray | 49, | Chip determining device |
| 10, | Game participant | 50, | Control device |
| 11, | Dealer | 106, | Counter line |

What is claimed is:

1. A management system comprising:

a first gaming table having a first gaming table layout including a first plurality of betting areas as first betting targets for baccarat;

a second gaming table having a second gaming table layout including a second plurality of betting areas as second betting targets, wherein:

both of the first gaming table layout and the second gaming table layout have non-side bet areas and side bet areas, the second gaming table layout is different from the first gaming table layout in:

a number of playing positions, a betting area characteristic, or a combination thereof, and each of the first plurality of betting areas and the second plurality of betting areas includes the betting area characteristic, the betting area characteristic includes a betting area size, a betting area positional relationship, a side bet betting area type, a betting area color, or a combination thereof;

a first betting amount determination system configured to determine a first betting amount of the first gaming table layout;

a second betting amount determination system configured to determine a second betting amount of the second gaming table layout; and one or more processors configured to perform a first comparison based on the first betting amount of the first gaming table layout and the second betting amount of the second gaming table layout.

2. The management system according to claim 1, wherein, each betting area of the first plurality of betting areas and the second plurality of betting areas has a boundary line to demarcate the betting area.

3. The management system according to claim 1, wherein the first plurality of betting areas or the second plurality of betting areas do not have border lines and are distinguished from a background of the respective first gaming table layout or the respective second gaming table layout by a color or a color density.

4. The management system according to claim 1, wherein:

each gaming chip of a plurality of gaming chips includes:

a respective characteristic color that corresponds to a respective type of the gaming chip, and a common color that is commonly used for a plurality of different types of the plurality of gaming chips; and each betting area of the first plurality of betting areas and the second plurality of betting areas is colored in a color other than the common color.

5. The management system according to claim 1, wherein the first betting amount determination system comprises:

a first image capturing device configured to capture, from above and at a first angle, the first gaming table layout with a first set of one or more gaming chips placed on one or more betting areas of the first plurality of betting areas of the first gaming table layout to generate a first image; and a first image analyzing device configured to determine, based on the first image and using a first deep learning structured artificial intelligence image recognition model corresponding to the first gaming table layout:

types of the first set of one or more gaming chips placed on the one or more betting areas of the first plurality of betting areas of the first gaming table layout, the number of chips of the first set of one or more gaming chips placed on the one or more of the betting areas of the first gaming table layout, and the first betting targets of the first gaming table layout on which the first set of one or more gaming chips are placed, to determine betting amounts for each of the first betting targets;

the second betting amount determination system comprises:

a second image capturing device configured to capture, from above and at a second angle, the second gaming table layout with a second set of one or more gaming chips placed on one or more of the betting areas of the second gaming table layout to generate a second image; and a second image analyzing device configured to determine, based on the second image and using a second deep learning structured artificial intelligence image recognition model corresponding to the second gaming table layout:

types of the second set of one or more gaming chips placed on one or more betting areas of the second plurality of betting areas of the second gaming table layout, the number of chips of the second set of one or more gaming chips placed on the one or more betting areas of the second plurality of betting areas of the second gaming table layout, and the second betting targets of the second gaming table layout on which the second set of one or more gaming chips are placed, to determine betting amounts for each of the second betting targets.

6. The management system according to claim 5, wherein the first deep learning structured artificial intelligence image recognition model and the second deep learning structured artificial intelligence image recognition model are the same model which is used for the first gaming table layout and the second gaming table layout.

7. The management system according to claim 1, wherein, the first betting amount determination system is configured to determine a first side betting amount for the side bet areas of the first gaming table layout, the second betting amount determination system is configured to determine a second side betting amount for the side bet areas of the second gaming table layout, and the one or more processors is configured to perform a second comparison based on the first side betting amount for the side bet areas of the first gaming table layout and the second side betting amount for the side bet areas of the second gaming table layout.

8. The management system according to claim 1, wherein the one or more processors is configured to determine superiorities of the first gaming table layout and the second gaming table layout.

9. The management system according to claim 8, further comprising an output device configured to output an indication of the superiorities.

10. The management system according to claim 1, wherein the second gaming table layout is different from the first gaming table layout in the a number of playing positions and the betting area characteristic.

11. The management system according to claim 1, wherein:

a number of playing positions of the second gaming table layout is different from a number of playing positions of the first gaming table layout;

a betting area size of the second plurality of betting areas of the second gaming table layout is different from a betting area size of the first plurality of betting areas of the first gaming table layout;

a betting area positional relationship of the second plurality of betting areas of the second gaming table layout is different from a betting area positional relationship of the first plurality of betting areas of the first gaming table layout;

a side bet betting area type of the second plurality of betting areas of the second gaming table layout is different from a side bet betting area type of the first plurality of betting areas of the first gaming table layout; and a betting area color of the second plurality of betting areas of the second gaming table layout is different from a betting area color of the first plurality of betting areas of the first gaming table layout.

12. A management system comprising:

a first gaming table have a first gaming table layout including a first plurality of betting areas as first betting targets for baccarat;

a second gaming table having a second gaming table layout including a second plurality of betting areas as second betting targets, wherein:

both of the first gaming table layout and the second gaming table layout have non-side bet areas and side bet areas, the second gaming table layout is different from the first gaming table layout in a number of playing positions, a betting area characteristic, or a combination thereof, and each of the first plurality of betting areas and the second plurality of betting areas includes the betting area characteristic, the betting area characteristic includes a betting area size, a betting area positional relationship, a side bet betting area type, a betting area color, or a combination;

a first revenue amount determination system configured to determine a first revenue amount for a casino at the first gaming table;

a second revenue amount determination system configured to determine a second revenue amount for the casino at the second gaming table; and one or more processors configured to compare the first revenue amount and the second revenue amount.

13. The management system according to claim 12, wherein:

the first revenue amount determination system comprises:

a first image capturing device configured to capture, from above and at an angle, the first gaming table layout with a first set of one or more gaming chips placed on one or more betting areas of the first plurality of betting areas of the first gaming table layout to generate a first image;

a first image analyzing device configured to determine, based on the first image and using a first deep learning structured artificial intelligence image recognition model corresponding to the first gaming table layout:

types of the gaming chips placed on the one or more betting areas of the first plurality of betting areas of the first gaming table layout, the number of chips of the first set of one or more gaming chips placed on the one or more of the plurality of first betting areas of the first gaming table layout, and the first betting targets of the first gaming table layout on which the first set of one or more gaming chips are placed, to determine betting amounts for each of the first betting targets;

a first card shoe configured to detect the ranks of cards drawn therefrom to the first gaming table to determine a result of a game on the first gaming table based on the detected ranks; and a first processor configured to determine the first revenue amount based on the betting amounts of each of the first betting targets and the result of the game, the second revenue amount determination system comprises:

a second image capturing device configured to capture, from above and at an angle, the second gaming table layout with a second set of one or more gaming chips placed on one or more betting areas of the second plurality of betting areas of the second gaming table layout to generate a second image;

a second image analyzing device configured to determine, based on the second image and using a second deep learning structured artificial intelligence image recognition model corresponding to the second gaming table layout:

types of the second set of one or more gaming chips placed on the one or more betting areas of the second plurality of betting areas of the second gaming table layout, the number of chips of the second set of one or more gaming chips placed on the one or more betting areas of the second plurality of betting areas of the second gaming table layout, and the second betting targets of the second gaming table layout on which the second set of one or more gaming chips are placed, to determine betting amounts for each of the second betting targets;

a card shoe, where in the card shoe is configured to detect the ranks of cards drawn therefrom to the second gaming table to determine a result of a game on the second gaming table based on the detected ranks; and a second processor, wherein the second processor is configured to determine the second revenue amount based on the betting amounts of each of the second betting targets and the result of the game.

14. The management system according to claim 13, wherein the first deep learning structured artificial intelligence image recognition model and the second deep learning structured artificial intelligence image recognition model are the same model which is used for the first gaming table layout and the second gaming table layout.

15. The management system according to claim 12, wherein, each betting area of the first plurality of betting areas and the second plurality of betting areas has a boundary line to demarcate the betting area.

16. The management system according to claim 12, wherein the first plurality of betting areas or the second plurality of betting areas do not have border lines and are distinguished from a background of the respective first gaming table layout or the respective second gaming table layout by a color or a color density.

17. The management system according to claim 12, wherein:

each gaming chip of a plurality of gaming chips includes:

a respective characteristic color that corresponds to a respective type of the gaming chip, and a common color that is commonly used for a plurality of different types of the plurality of gaming chips; and each betting area of the first plurality of betting areas and the second plurality of betting areas is colored in a color other than the common color.

18. The management system according to claim 12, wherein the one or more processors is configured to determine superiorities of the first gaming table layout and the second gaming table layout.

19. The management system according to claim 18, further comprising an output device, wherein the output device is configured to output the superiorities.

20. The management system according to claim 12, wherein the second gaming table layout is different from the first gaming table layout in the a number of playing positions and the betting area characteristic.

21. The management system according to claim 12, wherein:

a number of playing positions of the second gaming table layout is different from a number of playing positions of the first gaming table layout;

a betting area size of the second plurality of betting areas of the second gaming table layout is different from a betting area size of the first plurality of betting areas of the first gaming table layout;

a betting area positional relationship of the second plurality of betting areas of the second gaming table layout is different from a betting area positional relationship of the first plurality of betting areas of the first gaming table layout;

a side bet betting area type of the second plurality of betting areas of the second gaming table layout is different from a side bet betting area type of the first plurality of betting areas of the first gaming table layout; and a betting area color of the second plurality of betting areas of the second gaming table layout is different from a betting area color of the first plurality of betting areas of the first gaming table layout.

22. A management system comprising:

a first gaming table having a first gaming table layout including a first plurality of betting areas as first betting targets for baccarat;

a second gaming table having a second gaming table layout including a second plurality of betting areas as second betting targets, wherein:

both of the first gaming table layout and the second gaming table layout have non-side bet areas and side bet areas, the second gaming table layout is different from the first gaming table layout in a number of playing positions, a betting area characteristic, or a combination thereof, and each of the first plurality of betting areas and the second plurality of betting areas includes the betting area characteristic, the betting area characteristic includes a betting area size, a betting area positional relationship, a side bet betting area type, a betting area color, or a combination; and a first betting amount determination system configured to determine a first betting amount for the non-side bet areas of the first gaming table layout and a second betting amount for the side bet areas of the first gaming table layout;

a second betting amount determination system configured to determine a third betting amount for the non-side bet areas of the second gaming table layout and a fourth betting amount for the side bet areas of the second gaming table layout; and one or more processors configured to compare:

(a) a first ratio:

(a-1) of the second betting amount for the side bet areas of the first gaming table layout to the first betting amount for the non-side bet areas of the first gaming table layout; or (a-2) of the second betting amount for the side bet areas of the first gaming table layout to the first betting amount for the non-side bet areas of the first gaming table layout and the second betting amount for the side bet areas of the first gaming table layout; and (b) a second ratio:

(b-1) of the fourth betting amount for the side bet areas of the second gaming table layout to the third betting amount for the non-side bet areas of the second gaming table layout; or (b-2) of the fourth betting amount for the side bet areas of the second gaming table layout to the third betting amount for the non-side bet areas of the second gaming table layout and the fourth betting amount for the side bet areas of the second gaming table layout.

23. The management system according to claim 22, wherein, each betting area of the first plurality of betting areas and the second plurality of betting areas has a boundary line to demarcate the betting area.

24. The management system according to claim 22, wherein the first plurality of betting areas or the second plurality of betting areas do not have border lines and are distinguished from a background of the respective first gaming table layout or the respective second gaming table layout by a color or a color density.

25. The management system according to claim 22, wherein:

each gaming chip of a plurality of gaming chips includes:

a respective characteristic color that corresponds to a respective type of the gaming chip, and a common color that is commonly used for a plurality of different types of the plurality of gaming chips; and each bet area of the first plurality of betting areas and the second plurality of betting areas is colored in a color other than the common color.

26. The management system according to claim 22, wherein:

the first betting amount determination system comprises:

a first image capturing device configured to capture, from above and at an angle, the first gaming table layout with a first set of one or more gaming chips placed on one or more betting areas of the first plurality of betting areas of the first gaming table layout to generate a first image; and a first image analyzing device configured to determine, based on the first image and using a first deep learning structured artificial intelligence image recognition model corresponding to the first gaming table layout:

types of the first set of one or more gaming chips placed on the one or more betting areas of the first plurality of betting areas of the first gaming table layout, a number chips of the first set of one or more gaming chips placed on the one or more betting areas of the first plurality of betting areas of the first gaming table layout, and the first betting targets of the first gaming table layout on which the first set of one or more gaming chips are placed, to determine betting amounts for each of the first betting targets;

the second betting amount determination system comprises:

a second image capturing device configured to capture, from above and at an angle, the second gaming table layout with a second set of one or more gaming chips placed on one or more betting areas of the second plurality of betting areas of the second gaming table layout to generate a second image; and a second image analyzing device configured to determine, based on the second image and using a second deep learning structured artificial intelligence image recognition model corresponding to the second gaming table layout:

types of the second set of one or more gaming chips placed on the one or more betting areas of the second plurality of betting areas of the second gaming table layout, the number of chips of the second set of one or more gaming chips placed on the one or more betting areas of the second plurality of betting areas of the second gaming table layout, and the second betting targets of the second gaming table layout on which the second set of one or more gaming chips are placed, to determine betting amounts for each of the second betting targets.

27. The management system according to claim 26, wherein the first deep learning structured artificial intelligence image recognition model and the second deep learning structured artificial intelligence image recognition model are the same model which is used for the first gaming table layout and the second gaming table layout.

28. The management system according to claim 22, wherein the one or more processors is configured to determine superiorities of the first gaming table layout and the second gaming table layout.

29. The management system according to claim 28, further comprising an output device, wherein the output device is configured to output the superiorities.

30. The management system according to claim 22, wherein the second gaming table layout is different from the first gaming table layout in the a number of playing positions and the betting area characteristic.

31. The management system according to claim 22, wherein:

a number of playing positions of the second gaming table layout is different from a number of playing positions of the first gaming table layout;

a betting area size of the second plurality of betting areas of the second gaming table layout is different from a betting area size of the first plurality of betting areas of the first gaming table layout;

a betting area positional relationship of the second plurality of betting areas of the second gaming table layout is different from a betting area positional relationship of the first plurality of betting areas of the first gaming table layout;

a side bet betting area type of the second plurality of betting areas of the second gaming table layout is different from a side bet betting area type of the first plurality of betting areas of the first gaming table layout; and a betting area color of the second plurality of betting areas of the second gaming table layout is different from a betting area color of the first plurality of betting areas of the first gaming table layout.

32. The management system according to claim 22, wherein one or more processors configured to compare (a) the first ration (a-1) and (b) the second ratio (b-1).

33. The management system according to claim 22, wherein one or more processors configured to compare (a) the first ration (a-2) and (b) the second ratio (b-2).

* * * * *